United States Patent

Budrys et al.

[15] 3,694,583

[45] Sept. 26, 1972

[54] SPEED CALLING CONTROL AND STORE

[72] Inventors: Ignas Budrys; Ernest O. Lee, Jr., both of Fairport, N.Y.

[73] Assignee: Stromberg-Carlson Corporation, Rochester, N.Y.

[22] Filed: Dec. 10, 1970

[21] Appl. No.: 96,928

[52] U.S. Cl. ....................179/18 BA

[51] Int. Cl. ....................H04m 3/44

[58] Field of Search ....................179/18 BA

[56] References Cited

UNITED STATES PATENTS

| | | | |
|---|---|---|---|
| 3,334,190 | 8/1967 | Jenkins et al. | 179/18 BA |
| 3,524,941 | 8/1970 | Friese et al. | 179/18 BA |

*Primary Examiner*—William C. Cooper
*Attorney*—Craig, Antonelli, Stewart & Hill

[57] ABSTRACT

A speed calling control and store for a PBX wherein the storage facility is time shared by all parties to the system and is capable of storing either a fourteen digit number or two seven digit numbers in each storage location, the fourteen digit and seven digit storage locations being segregated so as to provide for maximum efficiency in storage.

16 Claims, 8 Drawing Figures

FIG I

Figure 1:
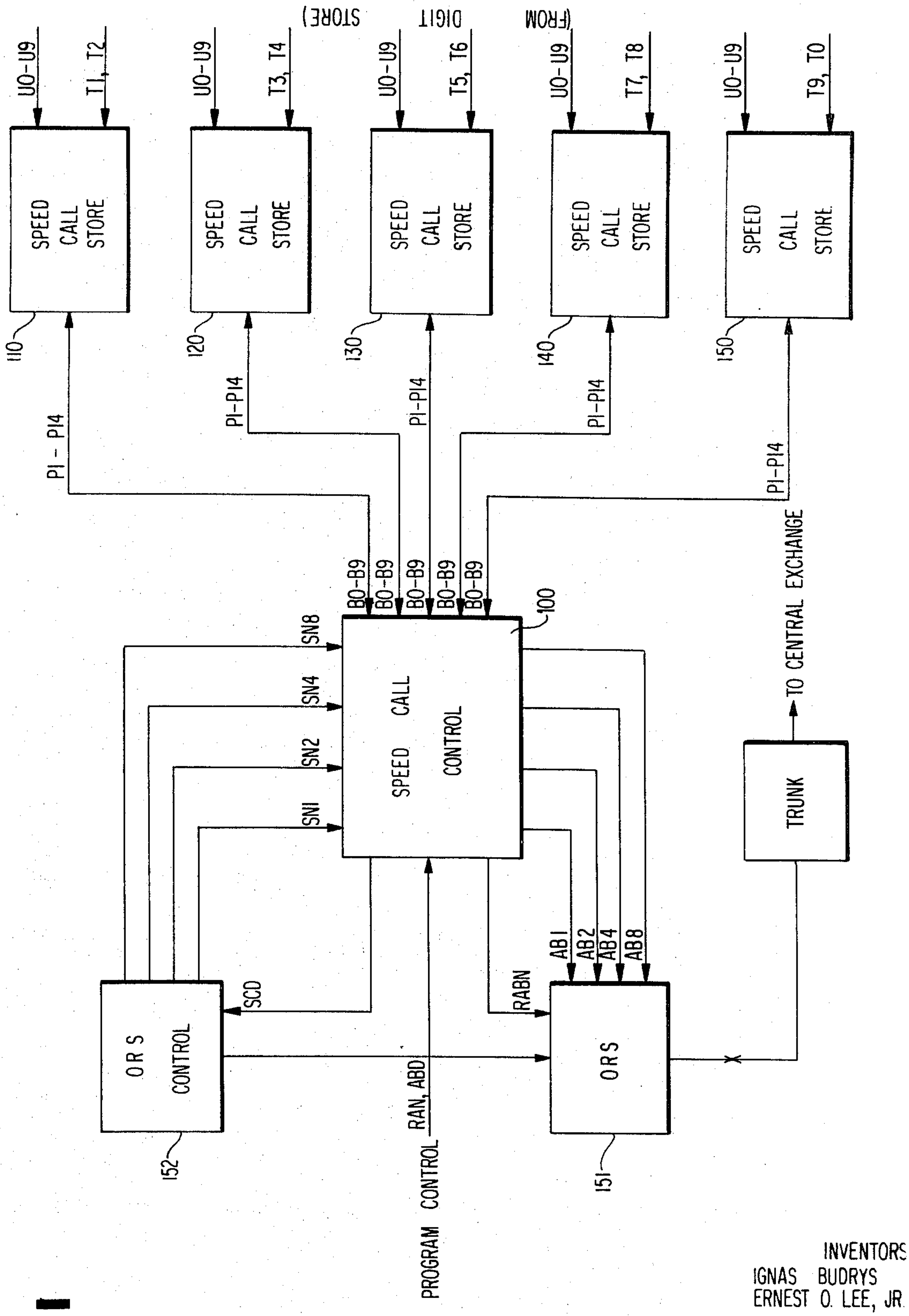

INVENTORS
IGNAS BUDRYS
ERNEST O. LEE, JR.

BY Craig, Antonelli, Stewart & Hill

ATTORNEYS

| FOR NUMBER 613 | | | | FOR NUMBER 617 | | | | FOR NUMBER 623 | | | |
|---|---|---|---|---|---|---|---|---|---|---|---|
| DIGIT NO. | DIGIT VALUE | STRAP FROM | STRAP TO | DIGIT NO. | DIGIT VALUE | STRAP FROM | STRAP TO | DIGIT NO. | DIGIT VALUE | STRAP FROM | STRAP TO |
| 1 | 7 | 3-1 | B7 | 1 | 2 | 7-1 | B2 | 1 | 5 | 3-8 | B5 |
| 2 | 1 | 3-2 | B1 | 2 | 3 | 7-2 | B3 | 2 | 3 | 3-9 | B3 |
| 3 | 8 | 3-3 | B8 | 3 | 1 | 7-3 | B1 | 3 | 6 | 3-10 | B1 |
| 4 | 9 | 3-4 | B9 | 4 | 5 | 7-4 | B5 | 4 | 4 | 3-11 | B4 |
| 5 | 3 | 3-5 | B3 | 5 | 1 | 7-5 | B1 | 5 | 6 | 3-12 | B6 |
| 6 | 1 | 3-6 | B1 | 6 | 6 | 7-6 | B6 | 6 | 1 | 3-13 | B1 |
| 7 | 5 | 3-7 | B5 | 7 | 3 | 7-7 | B3 | 7 | 8 | 3-14 | B8 |

FIG. 7

FIG. 8

| DIGIT NO. | DIGIT VALUE | STRAP FROM | STRAP TO |
|---|---|---|---|
| 1 | 2 | 5-1 | B2 |
| 2 | 1 | 5-2 | B1 |
| 3 | 7 | 5-3 | B7 |
| 4 | 1 | 5-4 | B1 |
| 5 | 5 | 5-5 | B5 |
| 6 | 3 | 5-6 | B3 |
| 7 | 2 | 5-7 | B2 |
| 8 | 9 | 5-8 | B9 |
| 9 | 0 | 5-9 | B0 |
| 10 | 4 | 5-10 | B4 |
| 11 | 1 | 5-11 | B1 |
| 12 | 5 | 5-12 | B5 |
| 13 | 1 | 5-13 | B1 |
| 14 | 6 | 5-14 | B6 |

SPEED CALLING CONTROL AND STORE

The present invention relates in general to automatic telephone systems, and more particularly, to a private automatic branch exchange (PABX) providing an abbreviated dialing feature.

In the continuing effort to provide telephone systems which are more efficient, versatile and easier to use, many special automatic features have been and are continually being devised and improved upon by the telephone industry. An early one of these special features is speed calling or abbreviated dialing, which permits the establishment of a call to a frequently called telephone number by means of a code consisting of less digits than make up the telephone number.

The early abbreviated dialing systems were motivated to a great extent by the great increase in the number of telephone subscribers across the country, which resulted in the necessity to generally increase the number of digits making up a telephone number from four to seven. Since that time, with the advent of direct dialing, which requires an additional three or four digits, and the possibility of international direct dialing, requiring an additional three digits, the need for abbreviated dialing for directory numbers consisting of as many as 14 digits is even more obvious.

One of the problems which has been encountered in connection with abbreviated dialing systems is the ability to provide sufficient storage for a repertory of numbers to make the special feature available on an effective basis to a significant number of subscribers. Certain repertory dialing systems have utilized special storage equipment provided directly at the individual subscriber telephone; however, these arrangements have been generally unacceptable in view of the space problems created by the additional equipment at each subscriber telephone and the need to provide such storage facilities at each telephone subset from which the special feature is available. In a large office facility, if all personnel are to have advantage of the special abbreviated dialing feature, the cost in providing such equipment for each telephone, especially where most of the personnel are interested in the same repertory of numbers, is prohibitive.

Other abbreviated dialing systems for use in a central exchange provide a central memory or storage having a plurality of storage areas, each storage area being allocated to a given subscriber having the special feature and being identified within the system by the calling subscriber equipment number. However, in view of the provision of separate storage areas in the central memory for each subscriber, the number of subscriber numbers capable of storage in each area is necessarily limited to maintain the overall size of the memory within reasonable limits. In addition, problems concerning accessing of the various storage areas without requiring the dialing of more than a minimum number of digits by the calling subscriber have prevented effective use of this special feature in the past.

The latter problem has been avoided, for the most part, in PBX systems by providing a common or time-shared memory or storage having a repertory of numbers common to all of the subscribers associated with the exchange. In this way, a larger repertory of numbers can be stored, and where the PBX is serving a business office where most of the subscribers necessarily require access to the same parties outside of the system, maximum service can be provided to each subscriber. However, once again, with the great variation in the number of digits required for various calls to different locations, difficulty has been encountered in providing efficient use of the required storage areas of the abbreviated dialing system.

It is therefore an object of the present invention to provide a speed calling control and store for a private branch exchange which makes possible a more efficient use of the storage facilities required for the repertory of numbers.

It is a further object of the present invention to provide storage facilities for an abbreviated dialing feature which is capable of storing a plurality of subscriber numbers consisting of a varying number of digits in an extremely efficient manner.

It is another object of the present invention to provide a private branch exchange having an abbreviated dialing feature wherein the storage of subscriber numbers is controlled in such a manner as to make use of the maximum amount of storage space.

In accordance with the present invention, there is provided an abbreviated dialing feature whereby an authorized subscriber dialing a three-digit number generates a seven or 14 digit number which is outpulsed from the private branch exchange to the central exchange to establish a communication connection with a distant subscriber. The first digit of the three-digit code is the access digit and is the same for all codes. The second and third digits of the code designate the storage location in the memory for the particular subscriber number to be generated.

The speed calling store in accordance with the present invention is capable of storing numbers comprising up to 14 digits each; however, the speed calling control circuit is capable of steering into each storage location either two seven-digit numbers or one number consisting of greater than seven digits. Thus, the speed calling store is capable of retaining up to twice as many seven-digit numbers as fourteen-digit numbers and various combinations in between. In this way, seven- and 14-digit groups can be intermixed to make maximum use of the storage facility, thereby avoiding the situation where fifty percent of a storage location capable of storing 14 digits may be unused merely because it contains only a seven-digit number.

In accordance with the present invention, a maximum number of seven-digit subscriber numbers can be combined and stored in 14-digit storage locations in view of the provision of control circuitry which is capable of steering the seven- and 14-digit numbers out of the store in a controlled manner in accordance with the number of digits forming the particular number to be read out of the store.

The foregoing and other objects are achieved in accordance with the principles of the present invention, in one illustrative embodiment, by providing a storage for a repertory of numbers comprising a plurality of speed calling stores, each providing a plurality of storage locations capable of storing a 14-digit number. Each speed calling store is capable of being strapped for fourteen digits, in which case, read out in connection with each storage location will relate to more than seven digits. If unstrapped, the speed calling store will accommodate two seven-digit numbers in each storage location. While the hundreds digit of the three-digit code providing the abbreviated dialing feature serves as the access digit to the speed calling control and store circuits, the units digits of the three-digit code serves to identify the storage location to be accessed. The particular speed calling store desired is then determined by the tens digits, with each speed calling store being designated by a unique pair of tens digits, each digit of the pair designating one or the other seven digit half of each storage location in the store. The tens digit of the three-digit code are divided into odd and even numbers, with the odd numbers identifying one-half of each respective speed calling store and the even numbers identifying the other half of each speed calling store. Thus, for a speed calling store which is strapped to provide only numbers having in excess of seven digits, the hundred access digit, the odd tens digit identifying the particular store, and the units digit identifying the storage location in that store, will produce access to the required storage location. For speed calling stores which provide for storage of two seven-digit numbers in each storage location, a particular seven-digit number can be accessed only by identifying the odd or even tens digit which relates to that portion of the storage location in which the number is located.

Figure 2:
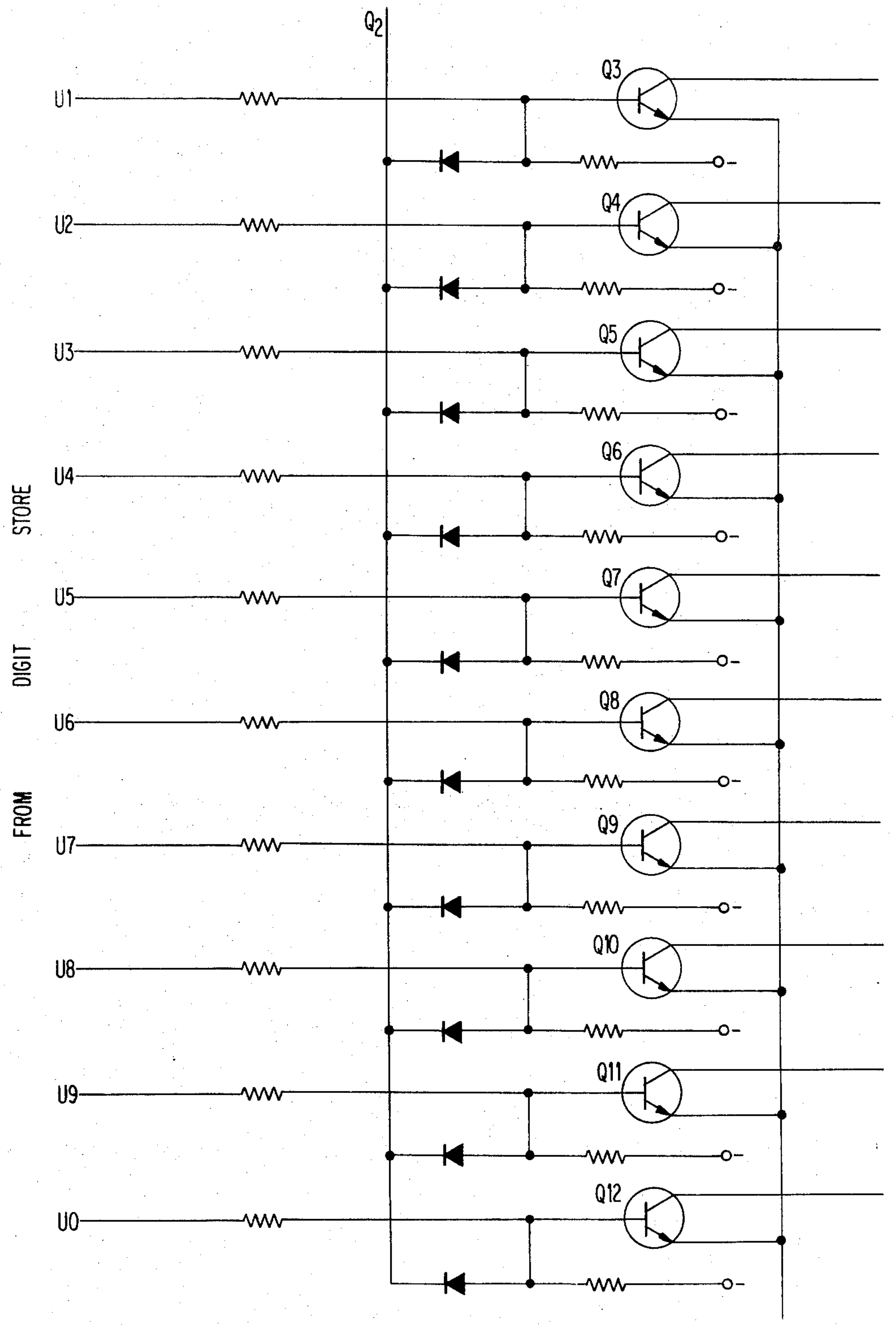
Figure 3:
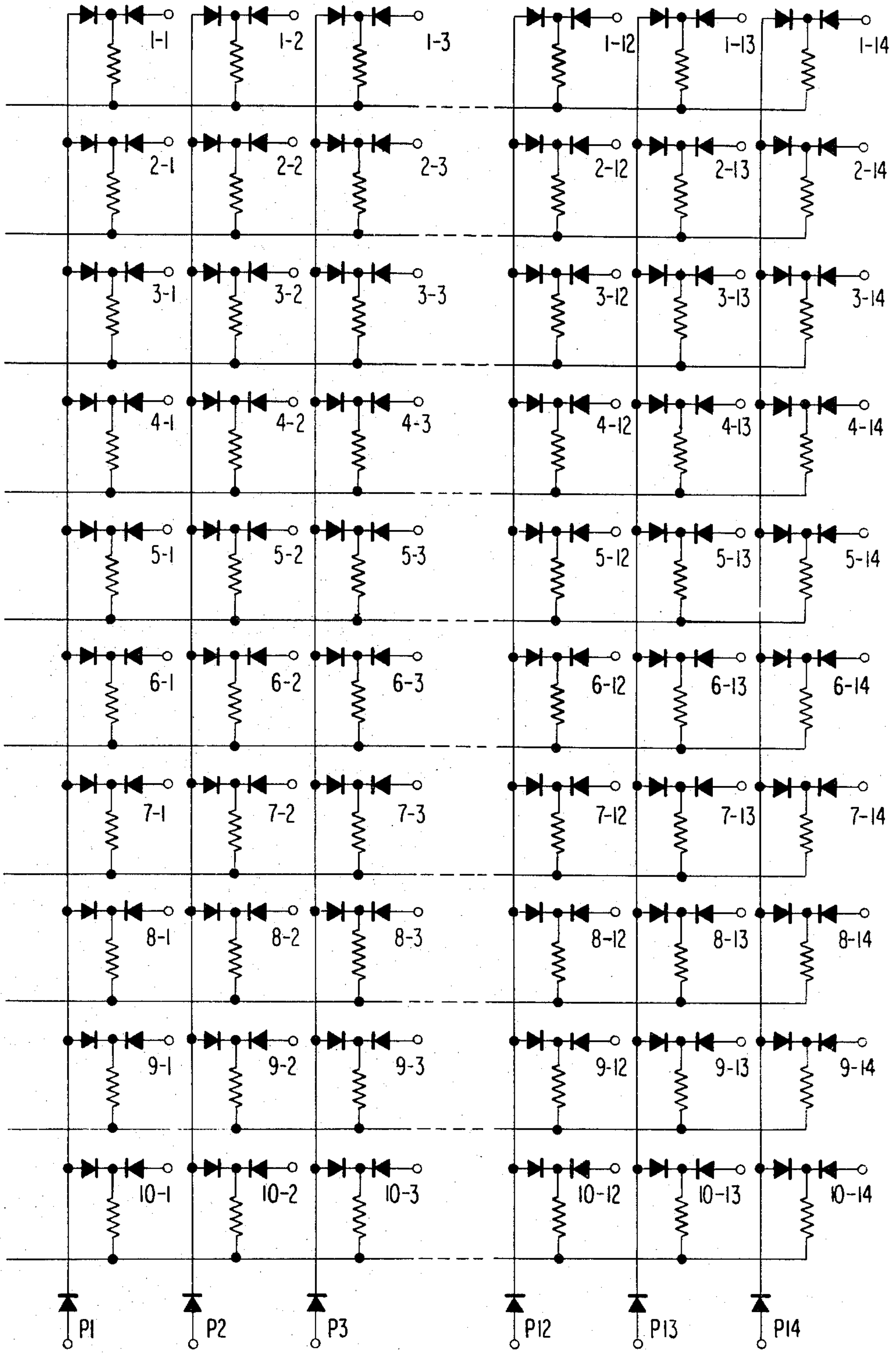
Figure 4:
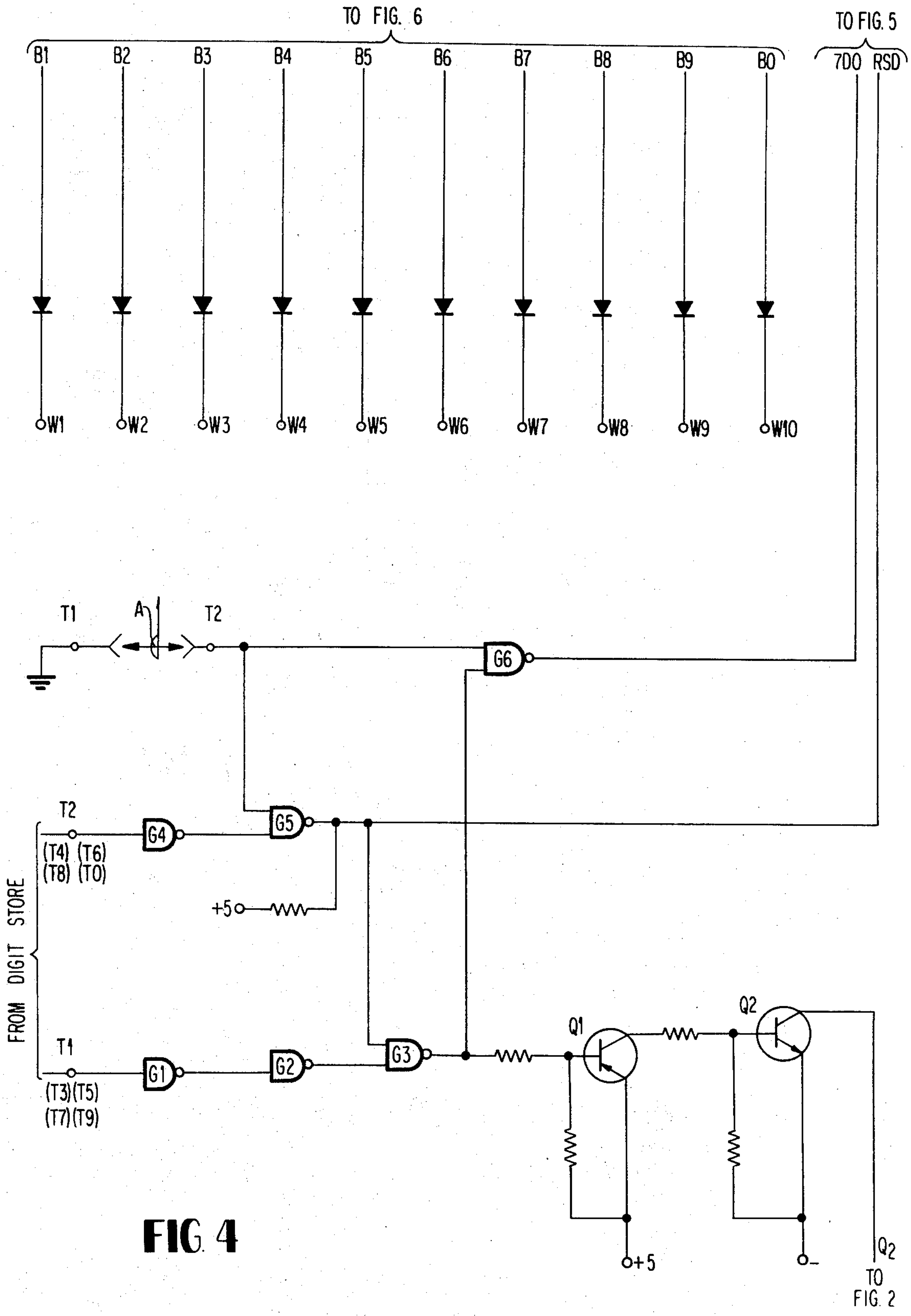
Figure 5:
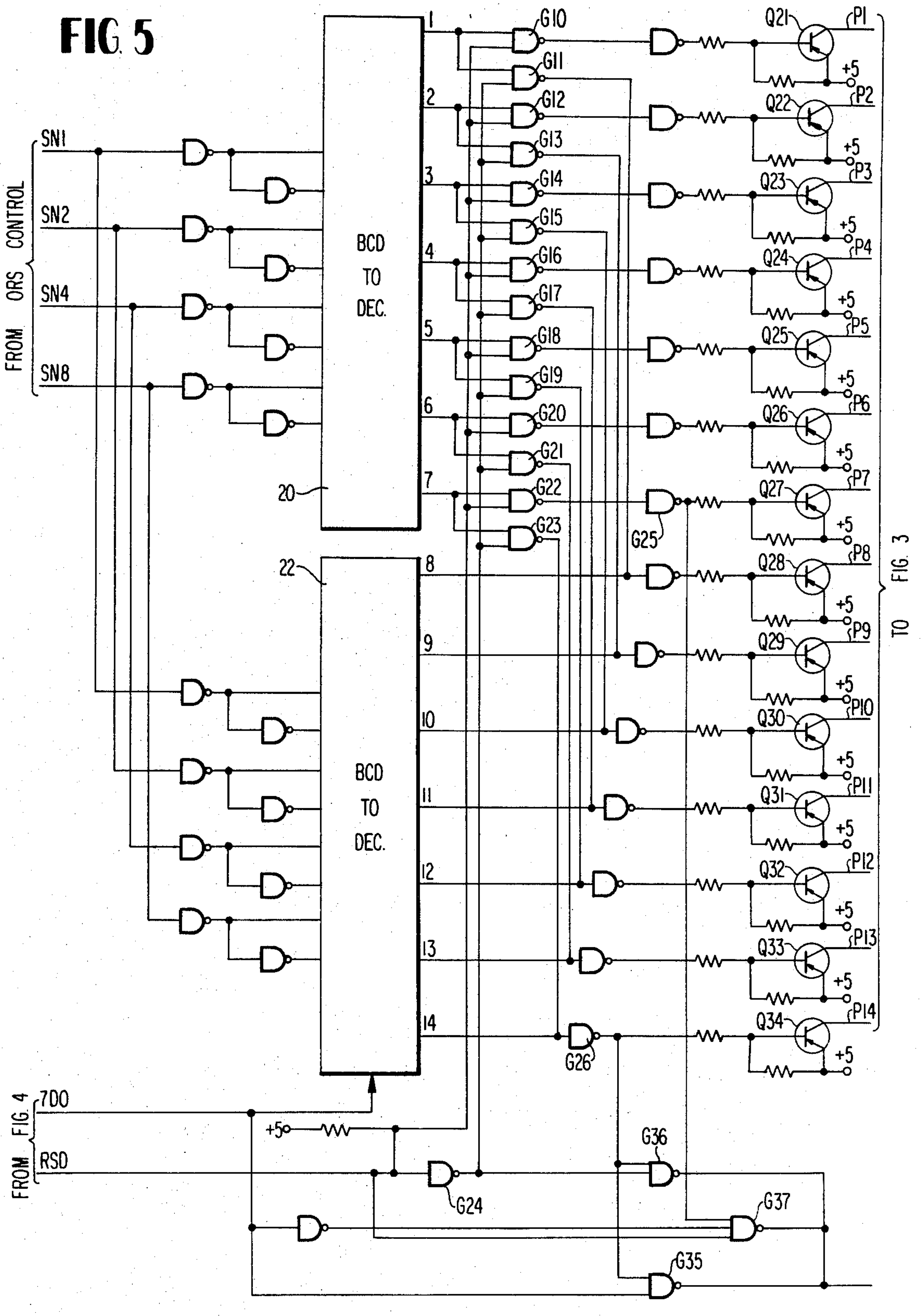
Figure 6:
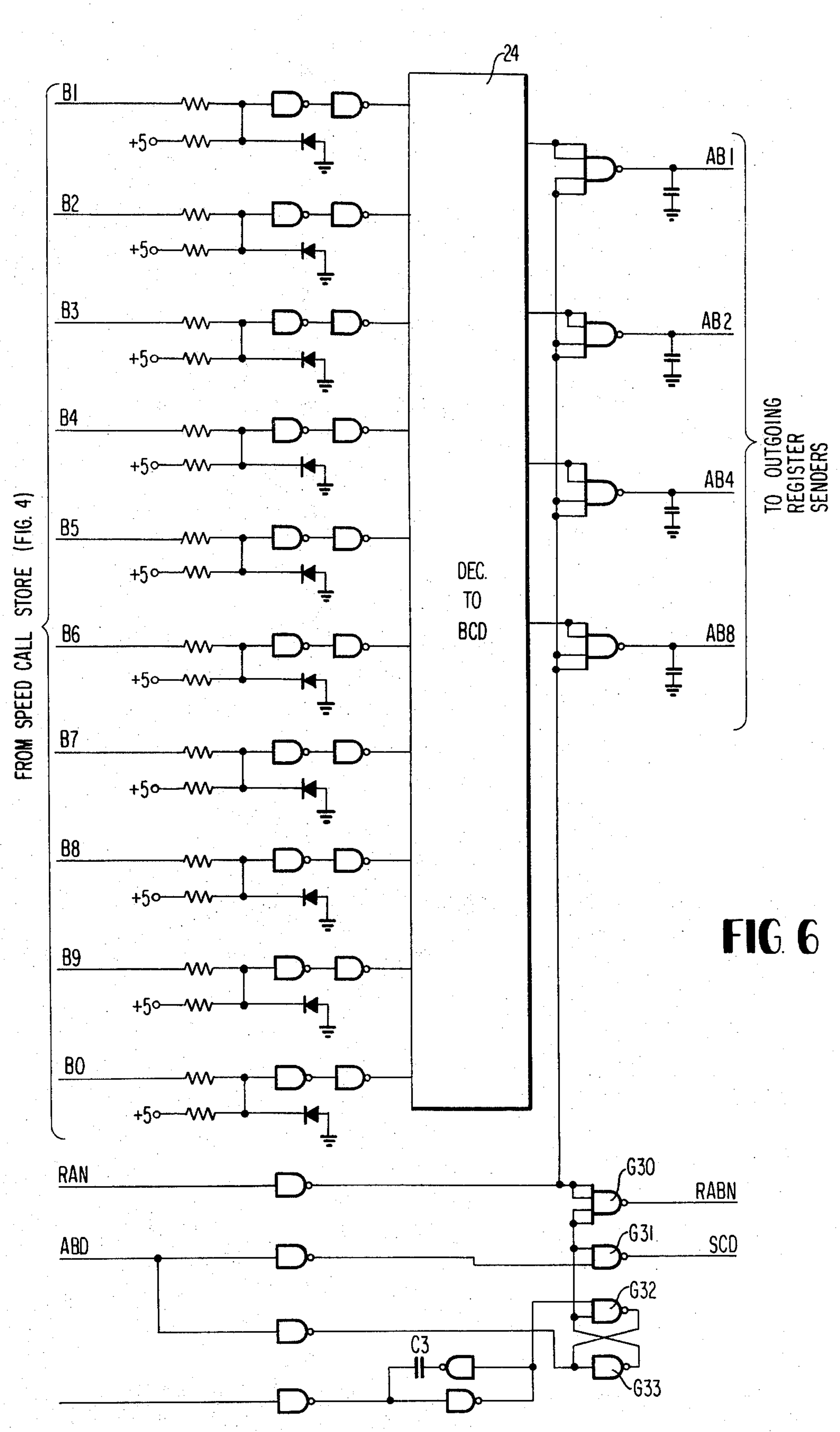

These and other objects, features, and advantages of the present invention will become more apparent from the following detailed description when taken in conjunction with the accompanying drawings, illustrating one embodiment of the present invention, and wherein:

FIG. 1 is a basic block diagram illustrating the present invention;

FIGS. 2, 3 and 4, when combined, provide a schematic circuit diagram of a speed call store; and FIGS. 5 and 6, when combined, provide a schematic circuit diagram of the speed call control.

FIGS. 7 and 8 are tables of strapping combinations.

The principles of the present invention are described in detail below in connection with one exemplary embodiment which is capable of use with the PABX telephone system disclosed in U. S. application Ser. No. 57,550, filed July 23, 1970, by Ernest O. Lee, Jr. and John A. Adams, Jr., and having the same assignee as the present application. It should be understood that the principles of the present invention may be applied to different telephone systems, however, for purposes of facilitating an understanding of the present invention, reference will be made throughout the following description to the register sender system disclosed in the aforementioned co-pending application.

GENERAL SYSTEM DESCRIPTION

FIG. 1 illustrates a block diagram including the speed calling circuit of the present invention made up of a speed call control 100 and a plurality of speed call stores 110–150, with an outgoing register sender 151 and ORS control 152. As indicated in the aforementioned co-pending application of Ernest O. Lee, Jr. et al., the basic function of the outgoing register sender 151 is to receive and store digits for later outpulsing to the central exchange in connection with trunk calls to points outside of the PABX. The ORS control 152 series to control the steering of digits from the speed call stores to the outgoing register sender in the proper time sequence. A progressive binary count represented by signals on one or more leads SN1, SN2, SN4 and SN8 from the ORS control 152 to the speed call control 100 serve to generate successive scanning signals P1–P14, which are applied to the speed call stores 110–150. In return, a multidigit number in binary coded decimal form will be provided from the speed call stores in sequence on one of leads B0–B9 to the speed call control from a selected one of the speed call stores, which numbers are then converted in the speed call control 100 to a binary form and are provided on outputs AB1, AB2, AB4 and AB8 to the outgoing register sender 151.

As indicated above, a three-digit code (for example, 6XX) is dialed in the case of speed calling, which indicates to the program control that this is a speed call and the location in the speed call store of the desired number. The units digit which is dialed is applied to all of the speed call stores; however, only selected tens digits are applied to particular speed call stores, so that the tens digit in effect identifies the speed call store containing the desired full digit number. In addition, in accordance with the present invention, depending on how the individual speed call store is strapped, the particular one of a pair of tens digits applied to each speed call store will designate the location in the store of the desired number. This will be described in greater detail hereinafter in connection with the specific circuitry of the speed call store.

The signals RAN and ABD from the program control to the speed call control 100 serve to enable the speed call control and also generate a signal RABN (read abbreviated number) which is applied to the outgoing register sender to hold that circuit until all digits of the desired number have been submitted thereto. In addition, a signal SCD (speed call dialed) is applied to the ORS control 152 to initiate the steering of digits from the speed call store to the outgoing register sender.

SPEED CALL STORE

As seen in FIG. 3, each speed call store consists of a matrix of ten horizontal lines and fourteen vertical lines, the cross-points of these horizontal and vertical lines each being interconnected through diodes to provide an output point. Thus, each horizontal line is capable of designating a fourteen-digit number, in which case the matrix would have a total capacity of ten numbers. On the other hand, each horizontal line may also designate two individual seven-digit numbers, in which case the speed call store would be capable of storing 20 numbers. In accordance with the present invention, as will be described in greater detail hereinafter, the respective speed call stores 110–150 can be strapped to accommodate either twenty seven-digit numbers or ten fourteen-digit numbers, so that the total storage capability of the exemplary system provides a minimum of 50 14-digit numbers and a maximum of one hundred seven-digit numbers, with various combinations between the two limits depending upon the particular strapping arrangement of the respective speed call stores.

Whenever an authorized subscriber dials a speed call combination (6XX), it is recognized by the common control as an abbreviated dialed number and outputs representing the units and tens digits dialed by the subscriber are presented to the speed call stores on leads U0–U9 and T1–T0 from the digit store. These signals are in decimal form, thus for each number, one T lead will change from +5 volts to ground and one U lead will change from open to +5 volts. As can be seen from FIG. 1, the tens leads T1–T0 are selectively connected in pairs to the speed call stores 110–150 so that each speed call store receives one odd and one even tens digit lead.

As seen in FIG. 4, the odd tens input, for example T1, is applied through a pair of inverter gates G1 and G2 to the input of an OR gate G3, the output of which is connected to a combination of transistors Q1 and Q2. The even tens digit, for example, T2, is applied through an inverter gate G4 to one input of an OR gate G5, the other input of which is connected to a terminal which may be selectively strapped to ground by means of a strap A. Thus, an output will be provided by the gate G5 only if the strap A is absent, which output will be applied through the OR gate G3 to the switching combination of transistors Q1 and Q2. As will be described in more detail hereinafter, the use of the strap A permits the storage of 14 digit numbers, while removal of the strap A provides for the storage of two seven-digit numbers per horizontal line in the storage matrix.

An OR gate G6 has inputs connected respectively to the terminal associated with the strap A and the output of the gate G3. The output of gate G6 under proper conditions, will indicate to the speed calling control that 14 digits will be read out from the speed call store. The output from the gate G5 is also provided on line RSD to the speed calling control indicating that the second seven-digit number stored on a horizontal line in the matrix is to be read out.

As seen in FIG. 2, the units digit dialed by the subscriber produces a signal of +5 volts from the digit store on one of the leads U1-U0 which is applied to a respective one of the transistor gates Q3–Q12. The collector output from each of these transistor gates is connected to a respective one of the horizontal lines of the storage matrix.

The operation of a speed call store as illustrated in FIGS. 2–4, is as follows. Assume first that strap A is in place providing ground at the input of gates G5 and G6. Thus, ground on the odd T digit lead wired to the position representing the particular tens group circuit will turn off the transistor switch Q1 by forcing the gate connected to its base circuit to go high (+5 v). With transistor Q1 turned off, transistor Q2 will also turn off, removing −48 volts from the bases of transistors Q3–Q12 (FIG. 2). At the same time, one of the U leads will go high (+5 v) and turn on the transistor associated with that particular input. As can be seen from FIG. 1, all of the U leads are routed to all five speed call store circuits but only the group wired for the particular tens digits will be activated, since in the other groups, absence of the tens digit will keep the transistor switch Q1 on and the +5 volt signal on the U lead will be clamped to approximately −48 volts in the base of the transistor representing the selected units digit. Assuming that the units digit was one, the U1 lead will go high turning on transistor Q3 and applying −48 volts to the first horizontal line of the matrix in FIG. 3.

The desired digits of the fourteen digit number are programmed by strapping the terminals 1–1 through 1–14, 2–1 through 2–14, etc. to a selected one of the terminals W1–W0 in FIG. 4. Thus, by strapping terminal 1–1 of the matrix to a particular one of the terminals W1–W0 representing the number of the first digit, terminal 1–2 to the same or another terminal W1–W0 as required for the second digit of the number, terminal 1–3 for the third digit of the number, etc., a 14-digit number can be strapped for the horizontal line of the switching matrix. Each of the horizontal lines is strapped in this manner to provide for storage of ten fourteen-digit numbers.

Normally the leads P1–P14 will be at +5 v. When the ORS control directs the read out of a number from the speed call store by providing a successive binary count on input leads SN1, SN2, SN4 and SN8, the P leads will be successively scanned by removing the +5 v from the lead. Thus, the −48 v. from the transistor switch connected to the horizontal line will appear on the W terminal representing the programmed number of the digit. The P leads will open sequentially, and in this manner a sequence of 14 negative levels will appear on W terminals representing the values of the digits in decimal form.

With the strap A in place, the even tens digits will be inhibited by OR gate G5 and the leads 7DO and RSD will be clamped to +5 volts. Thus, if the subscriber should dial the even tens digits associated with a speed call store strapped to store only fourteen-digit numbers, the speed call will not be established.

If the strap A is removed thereby converting the speed call store to a circuit capable of storing 20 seven-digit numbers, the presence of an odd or an even tens digit signal at gates G1 or G4 will provide a +5 volt signal at the base of transistor Q1 as well as ground on lead 7DO inhibiting the request for digits 8 through 14. The RDS lead will be high (+5 v) for an input on lead T1 and low (ground) for an input on lead T2, thus steering digit read out from the first seven digits to the last seven digits. The programming of the terminals 1–1 through 1–14, etc., are the same as described above, with the exception that terminals 1–1 through 1–7, 2–1 through 2–7, etc., store seven digit numbers in connection with an odd tens digits, while terminals 1–8 through 1–14, 2–8 through 2–14, etc., store seven digit numbers in connection with even tens digits. The output leads 7DO and RSD force the speed call control to scan sequentially through the first seven positions in the matrix for a dialed number including an odd tens digit and provides scanning through the second seven positions in connection with a number having an even tens digit. Thus, depending upon whether the tens digit of the abbreviated number is odd or even, a number stored in the first seven positions or the last seven positions of a horizontal line on the matrix will be read out. As in the previous example where fourteen digit numbers are stored, the particular horizontal line selected is determined by the units digits in the abbreviated number.

SPEED CALL CONTROL

The speed call control forms three basic functions: It controls digit read out, codes decimal numbers into binary coded decimal form and vice versa, and provides control when the digit is inserted into the outgoing register sender. This circuit is illustrated in detail in FIGS. 5 and 6.

A request for digit read out is generated by the ORS control 152 and is applied from leads SN1–SN8 from FIG. 9 of the aforementioned co-pending application of Ernest O. Lee, Jr. et al. The signal provided by these leads is in binary coded decimal form so that any one or more of these leads going low (ground) signifies a request for a particular digit. This is decoded in the BCD to decimal decoders 20 and 22 which produce a low (ground) on one of the outputs thereof depending upon the binary coded decimal input. The outputs 1 through 7 of the decoder 20 are applied to gates G10 through G23 forming a digit steering arrangement responsive to the signal RSD from the speed call store. The outputs of gates G10, G12, G14, G16, G18, G20 and G22 are applied through inverting gates to the control inputs of transistors Q21–Q26. The gates G11, G13, G15, G17, G19, G21 and G23 are applied along with the outputs 8–14 of the decoder 22 through inverters to the control inputs of transistors Q28–Q34. The outputs of transistors Q21 through Q34 provide the scanning signals P1–P14, which are applied to the speed call store to scan the information stored therein.

If the leads 7DO and RSD are high (+5 v), signifying that the speed call store is programmed for a 14-digit number, the decoded digit request will be routed to leads P1 through P14 sequentially, as the leads SN1–SN8 from the ORS control requests them. The lead 7DO enables the decoder 22 while the lead RSD directly enables the gates G10, G12, G14, G16, G18, G20 and G22, while the gates G11, G13, G15, G17, G19, G21 and G23 are inhibited from the output of gate G24. The output transistors Q21–Q34 will be on the idle condition, and the presence of a particular digit request will turn a given transistor off removing +5 volts from the associated P lead.

If the lead 7DO is at ground potential, signifying that the speed call store is programmed for seven-digit numbers, the decoder 22 will be inhibited. When a given seven-digit number that is programmed in the speed call store is addressed by an odd tens digit, the RSD lead will be high and the digit request will be steered to leads P1 through P7 in the manner described above in connection with the 14-digit storage. However, when a given seven-digit number that is programmed on the speed call store is designated by an even tens digit, the lead RSD will be low. Thus, gates G10, G12, G14, G16, G18, G20 and G22 will be inhibited directly from the lead RSD and the gates G11, G13, G15, G17, G19, G21 and G23 will be enabled from the output of gate G24. Thus, the request for read out of digits 1 through 7 will be routed to leads P8 through P14, respectively.

As indicated above, the programmed speed call number, whether seven digits or 14 digits, will appear in sequence on the B leads in FIG. 4 and will be applied to the corresponding leads in FIG. 6. Thus, one of the leads B1 through B0 will be enabled in a sequence which will make up the seven or fourteen digit number, as controlled by the ORS control. The presence of a requested digit will be indicated by the respective B lead going from +5 volts to −48 volts. This will be applied to the respective input of the decimal to BCD decoder 24. Here it will be encoded into binary coded decimal form and, when lead RAN from the program control is low (ground), one or more of the respective leads AB1–AB8 will be enabled to provide a binary indication of the digit. The outputs AB1, AB2, AB4 and AB8 are connected to the correspondingly designated inputs in FIG. 5 of the aforementioned co-pending application of Ernest O. Lee, Jr., et al.

Leads ABD and RAN are extended from the program control through the speed calling control to the ORS control, and the lead RAN is also extended to the outgoing register sender circuits as well. The functioning of these leads in connection with the outgoing register sender and ORS control is disclosed in detail in the aforementioned co-pending application of Ernest O. Lee, Jr. et al. During the abbreviated dial program, leads ABD and RAN are at ground. It is required to indicate to the ORS control when the last digit has been read out of the speed calling store. Thus, the lead ABD and the lead RAN are routed through the gates G30 and G31, which may be inhibited from the output of a flip-flop formed by gates G32 and G33. Control of this flip-flop is provided from the output of gates G35, G36 and G37 in FIG. 5. The function of the inhibit gates G30 and G31 is to force the leads SCD and RABN to +5 volts when the last digit in either a seven-digit or a 14-digit number has been read out from the speed call store to the outgoing register sender. Thus, when a 14-digit number is to be read out as indicated by the appropriate output from gate G24 connected to the lead RSD, the gate G35 will be enabled from the output of gate G26 thereby setting the flip-flop formed by gates G32 and G33 after an appropriate delay provided by the capacitor C3. Where a seven-digit number is to be read out, which number is stored in the first seven positions of the matrix, the proper combination of inputs on the leads 7DO and RSD will permit the enabling of gate G37 from the output of gate G25 when the final digit has been read out. In a similar manner, if the seven-digit number occupies the last seven storage places in the matrix, the proper input on lead 7DO will permit enabling of the gate G36 from the output of gate G26, to set the flip-flop after a predetermined delay. When the flip-flop is set, the leads SCD and RABN will go to the +5 volt level indicating to the outgoing register sender and the ORS control that the full number has been transferred. When the program terminates, the ABD lead will go to a +5 volts resetting the flip-flop.

The following examples will serve to clarify the manner of operation of the present invention. Assume that the abbreviated dialed number is 623, 613 and 617 are to be programmed into the numbers 536–4618, 718–9315 and 231–5163, respectively. Also assume that the speed call store 110 is provided for seven digit read out by removal of the strap A. FIG. 7 shows the required strap combination in the matrix to generate the required numbers to be transferred to the outgoing register sender.

Assume also that the speed calling store 120 is strapped for storage of 14 digit numbers and that the abbreviated dial number 635 relates to a number 2–171–532–904–1516. FIG. 8 shows the straps needed in the storage matrix in addition to the strap A which is also required in the case of 14 digit storage. Since the speed calling store 120 associated with the tens digits T3 and T4 is strapped for 14 digit abbreviated numbers, tens digit 4 cannot be used; thus, a subscriber dialing the abbreviated number 645 would receive only a busy signal indicating an improper number.

As can be seen from the foregoing description, the speed call store in accordance with the present invention provides a great versatility in the storage of numbers of varying length. The control over the storage arrangement permits the grouping of fourteen digit numbers in certain stores and seven digit numbers in other stores so as to make maximum use of the storage capacity and this is accomplished in a relatively simple and economic manner. In addition, relatively simple means are provided in the control circuit for indicating immediately when all digits of a required number have been outpulsed so that the speed call control and store arrangement may be immediately released for use in connection with another abbreviated call situation.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. In a private automatic branch exchange, a control and store arrangement capable of providing signals representing a full multi-digit number in response to receipt of an abbreviated number formed of first and second digit signals, comprising:

storage means including a plurality of individual number stores each capable of storing a plurality of multi-digit numbers in a respective one of a plurality of storage locations therein, and store control means responsive to said first digit signal of said abbreviated number for accessing a particular one of said individual number stores allocated to said first digit and responsive to said second digit signal for accessing a particular one of said plurality of storage locations in said accessed number store allocated to said second digit.

2. The combination defined in claim 1, wherein at least one of said number stores is arranged to store in each storage location thereof a number comprising up to a given number of digits and at least another one of said number stores is arranged to store in each storage location two numbers each comprising of up to one-half said given number of digits.

3. The combination defined in claim 2, wherein two individual values of said first digit designate said other one of said number stores, said store control means including steering means for accessing one or the other number in a storage location of said other one of said number stores in response to detection of one or the other value of said first digit.

4. The combination defined in claim 2, wherein each of said number stores includes a matrix of horizontal and vertical lines having the cross-points interconnected through diodes to strapping terminals, the strapping terminals along each horizontal line being capable of connection to output lines in a decimal combination representing a multi-digit number.

5. The combination defined in claim 4, wherein said number stores each further include input gating means for applying a first voltage to a selected horizontal line of the matrix in accordance with the value of said second digit, so that upon receipt of said abbreviated number said first voltage will be applied to the input gating means on one corresponding horizontal line in each number store.

6. The combination defined in claim 5, wherein said input gating means in each number store is normally inhibited, and each number store further includes means responsive to a respective value of said first digit for enabling the input gating means in only that one number store, so that only the storage location in the number store identified by said first and second digits is accessed.

7. The combination defined in claim 6, wherein said store control means includes scanning means for sequentially scanning the vertical matrix lines in each of said numbers stores.

8. In a private automatic branch exchange, a control and store arrangement capable of providing a full multi-digit number in response to receipt of an abbreviated number formed of first and second digits, comprising:

storage means including a plurality of number stores for storing a plurality of multi-digit numbers in respective storage locations, each number store including a matrix comprising m storage locations each accommodating one n digit number or two numbers of $n/2$ digits, store control means responsive to said first digit of said abbreviated number for accessing a particular number store and responsive to said second digit for accessing a particular storage location in said number stores, including steering means for directing the storage and readout of two $n/2$ digit numbers in each storage location, and selectively actuatable means in each number store for inhibiting said steering means in connection with that number store.

9. The combination defined in claim 8, wherein two individual values of said first digit designate each respective number store, said steering means being responsive to one value to effect readout and storage of one number in a storage location and responsive to the other value to effect readout and storage of the other number in that storage location.

10. The combination defined in claim 8, wherein each matrix comprises $m$ horizontal lines and $n$ vertical lines having the cross-points interconnected through diodes to strapping terminals, the strapping terminals along each horizontal line being capable of connection to output lines in a decimal combination representing a multi-digit number.

11. The combination defined in claim 10, wherein said number stores each further include input gating means for applying a first voltage to a selected horizontal line of the matrix in accordance with the value of said second digit, so that upon receipt of said abbreviated number said first voltage will be applied to the input gating means on one corresponding horizontal line in each number store.

12. The combination defined in claim 11, wherein said input gating means in each number store is normally inhibited, and each number store further includes means responsive to a respective value of said first digit for enabling the input gating means in only that one number store, so that only the storage location in the number store identified by said first and second digits is accessed.

13. The combination defined in claim 12, wherein said store control means includes scanning means for sequentially scanning the vertical matrix lines in each of said number stores.

14. The combination defined in claim 13, wherein a different odd and even value of said first digit of said abbreviated number is applied to each number store, said selectively actuatable means including control gate means for passing one of said values of said first digit to enable said input gating means and manually settable means for inhibiting said control gate means.

15. The combination defined in claim 14, wherein said steering means is responsive to the odd or even value of said first digit for controlling said scanning means to scan vertical lines 1 through $n/2$ or vertical lines $n/2+1$ through $n$, respectively, in each matrix.

16. The combination defined in claim 15, wherein said steering means is responsive to the inhibited condition of said control gate means for actuating said scanning means to scan all n vertical lines in each matrix.

* * * * *

UNITED STATES PATENT OFFICE
CERTIFICATE OF CORRECTION

PATENT NO. : 3,694,583

DATED : September 26, 1972

INVENTOR(S) : Ignas Budrys and Ernest O. Lee, Jr.

It is certified that error appears in the above–identified patent and that said Letters Patent are hereby corrected as shown below:

Col. 3, line 66 "ries" should read ---rves---.

Col. 9, line 52 Delete "of".

Signed and Sealed this

*twenty-first* Day of *October 1975*

[SEAL]

*Attest:*

RUTH C. MASON
*Attesting Officer*

C. MARSHALL DANN
*Commissioner of Patents and Trademarks*